United States Patent [19]
Imura et al.

[11] Patent Number: 5,814,352
[45] Date of Patent: Sep. 29, 1998

[54] DEVICE FOR EXTRUDING AUTOMOTIVE WEATHER STRIP

[75] Inventors: Hiroyoshi Imura; Sumito Ichinohe, both of Chiba, Japan

[73] Assignee: Kinugawa Rubber Ind. Co., Ltd., Chiba, Japan

[21] Appl. No.: 844,759

[22] Filed: Apr. 22, 1997

[30] Foreign Application Priority Data

Apr. 30, 1996 [JP] Japan .................................. 8-108996

[51] Int. Cl.⁶ .................................................. B29C 47/06
[52] U.S. Cl. ...................... 425/112; 425/113; 425/131.1; 264/107; 264/177.16; 264/252
[58] Field of Search ............................... 264/252, 177.1, 264/167, 177.16; 425/113, 112, 131.1

[56] References Cited

U.S. PATENT DOCUMENTS

| | | | |
|---|---|---|---|
| 3,067,455 | 12/1962 | Reid ........................................ | 425/113 |
| 4,510,715 | 4/1985 | Giguére ................................... | 49/488 |
| 5,137,675 | 8/1992 | Rabe ..................................... | 425/131.1 |
| 5,424,019 | 6/1995 | Miyakawa et al. .................. | 425/131.1 |
| 5,507,994 | 4/1996 | Cornils et al. .......................... | 264/252 |
| 5,645,785 | 7/1997 | Cornils et al. .......................... | 264/252 |

FOREIGN PATENT DOCUMENTS

| | | |
|---|---|---|
| 0 372 745 | 6/1990 | European Pat. Off. . |
| 0 427 381 A1 | 5/1991 | European Pat. Off. . |
| 0 638 408 A1 | 2/1995 | European Pat. Off. . |
| 53-36567 | 4/1978 | Japan .................................. 264/117.1 |
| 57-61543 | 4/1982 | Japan .................................. 264/177.1 |
| 58-76244 | 5/1983 | Japan .................................. 264/167 |
| 62-222825 | 9/1987 | Japan .................................. 425/113 |
| 1-314153 | 12/1989 | Japan .................................. 425/113 |
| 7-37937 | 8/1995 | Japan . |
| 7-54012 | 12/1995 | Japan . |
| 8-156584 | 6/1996 | Japan . |
| WO 90/08639 | 8/1990 | WIPO . |
| WO 91/12119 | 8/1991 | WIPO . |

OTHER PUBLICATIONS

Patent Abstracts of Japan, Tadanobu et al., vol. 14, No. 266 (1990)—02 076716 A (published Mar. 1990).

*Primary Examiner*—Robert Davis
*Attorney, Agent, or Firm*—Foley & Lardner

[57] ABSTRACT

For extruding an automotive weather strip which includes an elongate major portion and an elongate lip portion which is integrally formed on the major portion, an extruding device is provided, which comprises a material extruder for feeding a first material for the major portion; an additional material extruder for feeding a second material for the lip portion; a fixed shaping die formed with a main extruding opening from which the first material from the material extruder is extruded for formation of the major portion; a movable shaping die formed with an auxiliary extruding opening from which the second material from the additional material extruder is extruded for formation of the lip portion. The movable shaping die is movable relative to the fixed shaping die. The movable shaping die is located in front of the fixed shaping die and spaced from the same by a given distance.

9 Claims, 5 Drawing Sheets

DEVICE FOR EXTRUDING AUTOMOTIVE WEATHER STRIP

BACKGROUND OF THE INVENTION

1. Field of the Invention

The present invention relates to extruding devices for extruding an automotive plastic article, and more particularly to extruding devices for extruding an automotive weather strip which is arranged between a periphery of an automotive window opening and that of a window pane.

2. Description of the Prior Art

In order to clarify the task of the present invention, an automotive weather strip and a conventional device for extruding the same will be briefly described with reference to FIGS. 9 and 10 of the accompanying drawings.

In FIG. 10, there is partially shown the automotive weather strip 1 which is to be arranged between a periphery of a window opening of a vehicle (not shown) and that of a window pane (not shown). The weather strip 1 is constructed of an integrally molded plastic, and comprises generally an elongate major portion 2 which has a generally U-shaped cross section and an elongate lip portion 3 which extends along the major portion 2. As shown, the lip portion 3 projects outward from an upper surface 2b of an upper wall 2a of the major portion 2. Designated by numerals 3a and 3b are upper and side parts of the lip portion 3 which are to be placed at upper and side portions of the window opening, respectively. Upon assembly, the major portion 2 is tightly received on a peripheral edge of the window pane and the lip portion 3 is put on a recessed peripheral portion of the window opening. Due to provision of such recessed peripheral portion, a so-called flush-surface arrangement is achieved between the upper part 3a of the weather strip 1 and a body of the vehicle. As shown, the side part 3b of the lip portion 3 is gradually lowered as the distance from the upper part 3a increases, which constitutes a water drip channel between a side part of the window pane and that of the window opening of the vehicle body.

In FIG. 9, there is shown the conventional device for extruding the above-mentioned weather strip 1, which is described in, for example, Japanese Utility Model Second Provisional Publications 7-37937 and 7-54012.

The conventional extruding device comprises a material extruder 10 from which a fluidized plastic material is fed to a fixed shaping die 11. The fixed shaping die 11 is formed with a main extruding opening 13 of a generally C-shaped cross section, which is communicated with the material extruder 10. On a front surface of the shaping die 11, there is horizontally movably arranged a movable shaping plate 12 which is formed with an auxiliary extruding opening 14. As shown, when the movable shaping plate is 12 is properly placed on the fixed shaping die 11, the main opening 13 and the auxiliary opening 14 are merged to constitute a combined extruding opening 11' which has a shape corresponding to the cross section of the weather strip 1. The movable shaping plate 12 is horizontally driven by a drive device 15 through a shaft 15a. A wire 17 is driven by drive rollers 16 to pass through the main extruding opening 13 of the shaping die 11, which, as is seen from the drawing, serves as a reinforcing core member of the extruded weather strip 1.

In operation, the fluidized plastic material is fed from the material extruder 10 to the fixed shaping die 11 allowing the combined extruding opening 11' to continuously extrude the material. With this, an insufficiently cured weather strip 1 is produced, which includes the major portion 2 and the lip portion 3. When, during this extrusion, the movable shaping plate 12 is slowly moved in one direction, the lip portion 3 gradually changes its position relative to the major portion 2 for formation of the water drip channel.

However, due to its inherent construction, the above-mentioned conventional extruding device has failed to exhibit a satisfied extruding operation. In fact, during operation, it has often occurred that the fluidized plastic material leaks to a thin clearance inevitably formed between the fixed shaping die 11 and the movable shaping plate 12, which not only obstructs smoothed movement of the movable shaping plate 12, but also causes formation of unsightly fin on the extruded weather strip 1. Furthermore, during movement of the movable shaping plate 12, it has often occurred that due to a certain viscosity of the fluidized plastic material, the amount of the material extruded through the smaller auxiliary extruding opening 14 is varied, which prevents formation of a uniformed shape of the lip portion 3.

In order to eliminate the above-mentioned drawbacks, the applicants have thought out a measure which is described in Japanese Patent First Provisional Publication 8-156584. In this published measure, a movable shaping die connected to an additional material extruder is employed for extruding the lip portion 3 onto the major portion 2.

However, even the extruding device of this publication has failed to exhibit a satisfied extruding operation. That is, in this measure, joining the extruded lip portion 3 from the movable shaping die to the major portion 2 is carried out at the time when the major portion 2 is just extruded from the main shaping die. As is known, the fluidized plastic material just extruded is very unstable in dimension and shape, that is, such plastic material is subjected to a shrinkage. Thus, joining the lip portion 3 to such unstable major portion 2 inevitably lowers the dimensional stability and dimensional precision of the extruded weather strip 1.

SUMMARY OF THE INVENTION

It is therefore an object of the present invention to provide an extruding device for extruding an automotive weather strip, which is free of the above-mentioned drawbacks.

According to the present invention, there is provided a device for extruding a weather strip including an elongate major portion and an elongate lip portion which is integrally formed on the major portion. The device comprises a material extruder which feeds a first material for the major portion; an additional material extruder which feeds a second material for the lip portion; a fixed shaping die formed with a main extruding opening from which the first material from the material extruder is extruded for formation of the major portion; and a movable shaping die formed with an auxiliary extruding opening from which the second material from the additional material extruder is extruded for formation of the lip portion, the movable shaping die being movable relative to the fixed shaping die, wherein the movable shaping die is located in front of the fixed shaping die and spaced from the same by a given distance.

BRIEF DESCRIPTION OF THE DRAWINGS

Other objects and advantages of the present invention will become apparent from the following description when taken in conjunction with the accompanying drawings, in which.

DETAILED DESCRIPTION OF THE INVENTION

Before describing the construction of an extruding device of the present invention, a weather strip 1 produced by the device will be described for ease of understanding the extruding device.

Figure 1:
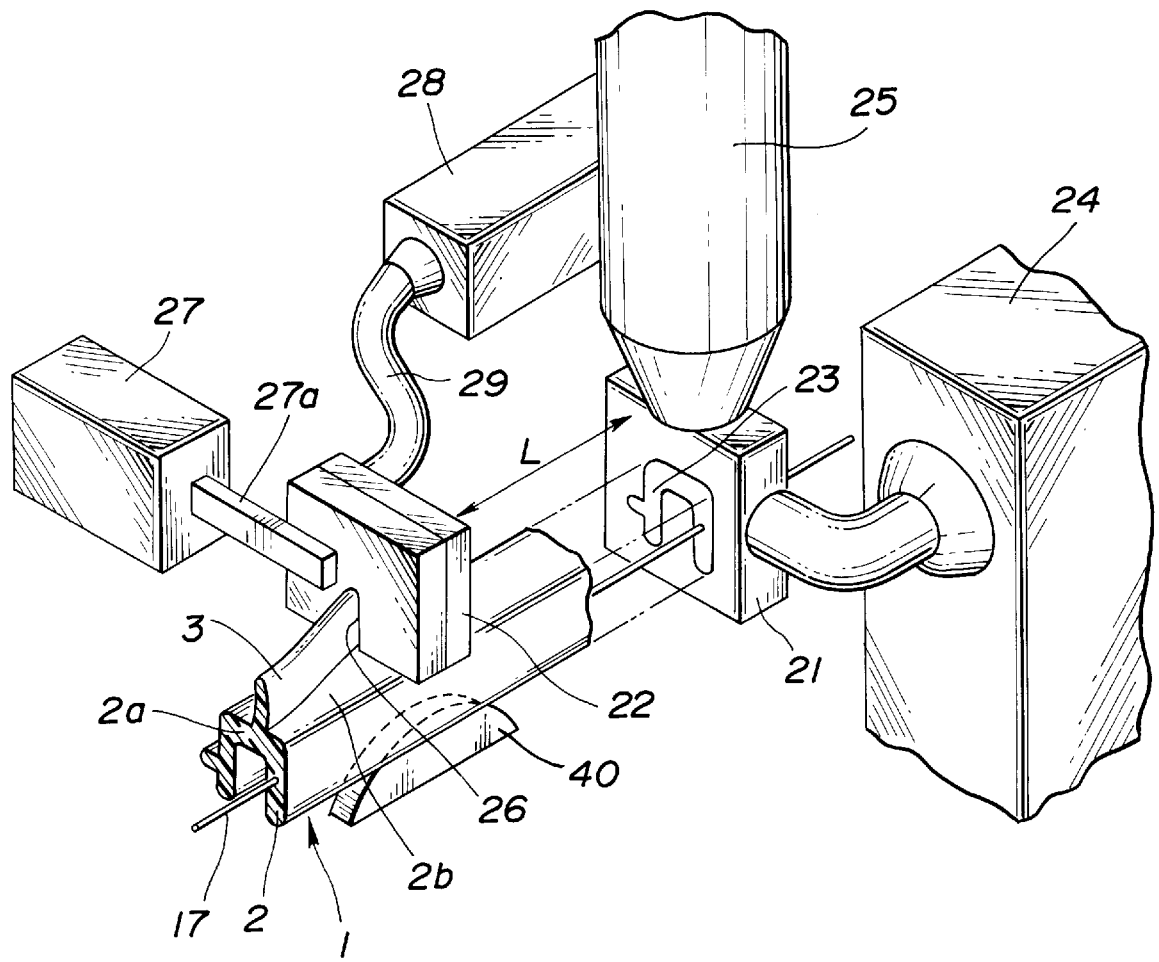
FIG. 1 is a perspective view of an extruding device of the present invention.
Figure 2:
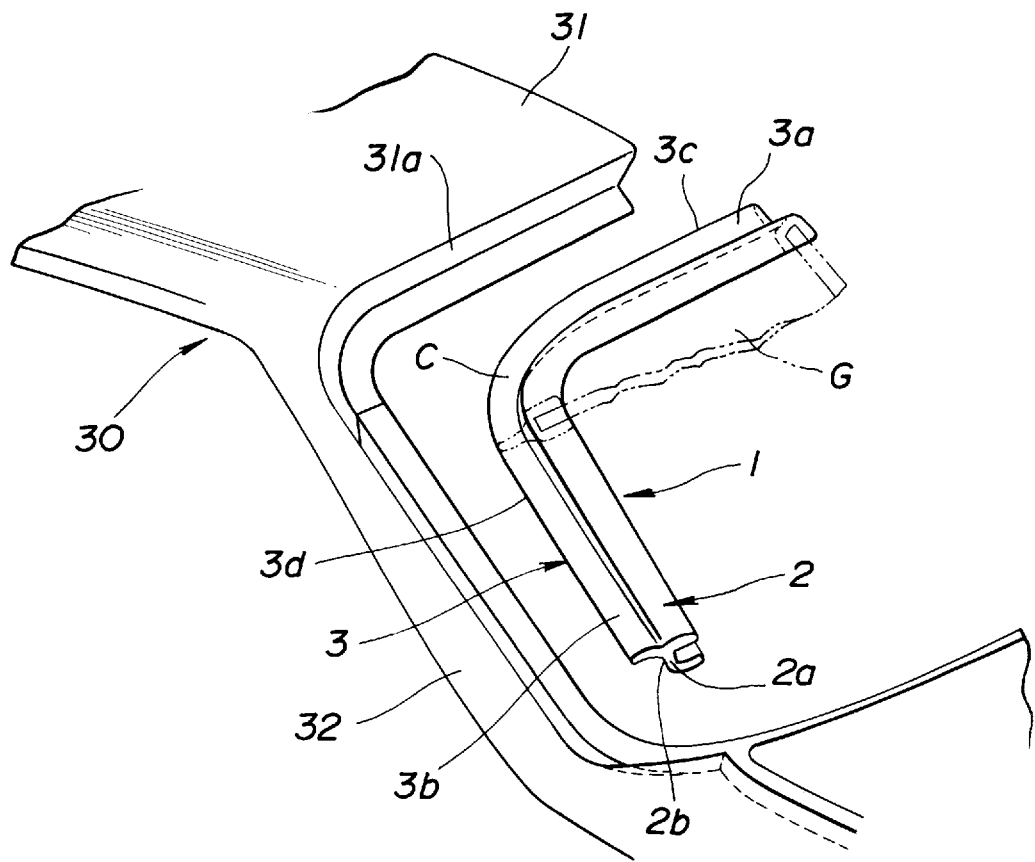
FIG. 2 is a rear but partial view of a motor vehicle, showing a weather strip to be applied to a rear window of the vehicle, the weather strip being produced by the extruding device of the invention.
Figure 10:
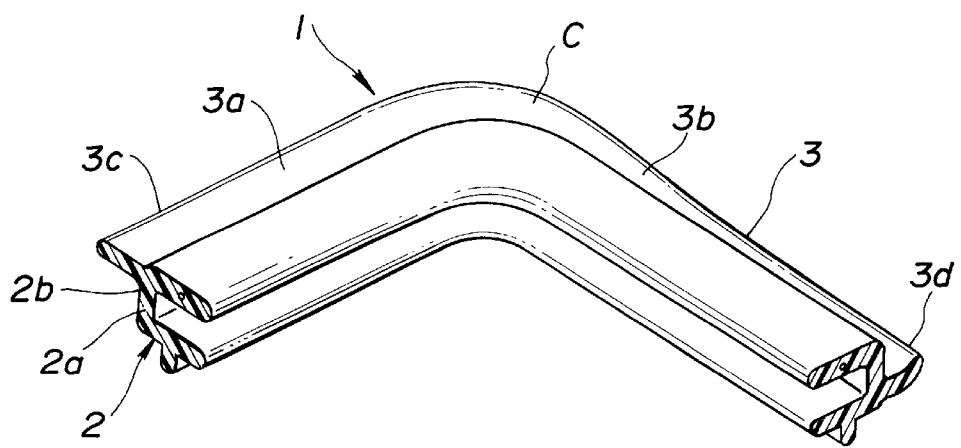
FIG. 10 is a perspective but partial view of a weather strip produced by the conventional extruding device of FIG. 9.

As is understood from FIG. 2, the weather strip 1 shown in FIGS. 1 to 5 is a strip applied to a rear window of a motor vehicle. That is, the weather strip 1 is shaped to be arranged between a periphery of a rear window opening of a vehicle body 30 and that of a window pane G. Similar to the above-mentioned weather strip 1 of FIG. 10, the weather strip 1 comprises generally an elongate major portion 2 having a generally U-shaped cross section and an elongate lip portion 3 extending along the major portion 2. That is, as is seen from FIG. 1, the lip portion 3 projects outward from an upper surface 2b of an upper wall 2a of the major portion 2.

For the reason which will be described hereinafter, the major portion 2 can be constructed of a soft or hard polyvinyl chloride (PVC) or a soft or hard polypropylene (PP), and the lip portion 3 can be constructed of a soft polyvinyl chloride (PVC) containing paraffin or butadiene acrylonitrile rubber (NBR).

As is seen from FIG. 2, upon assembly, the major portion 2 tightly received on the peripheral edge of the window pane G with an adhesive applied therebetween, and the lip portion 3 is put on a recessed peripheral portion of the rear window opening of the vehicle body 30.

Figure 3:
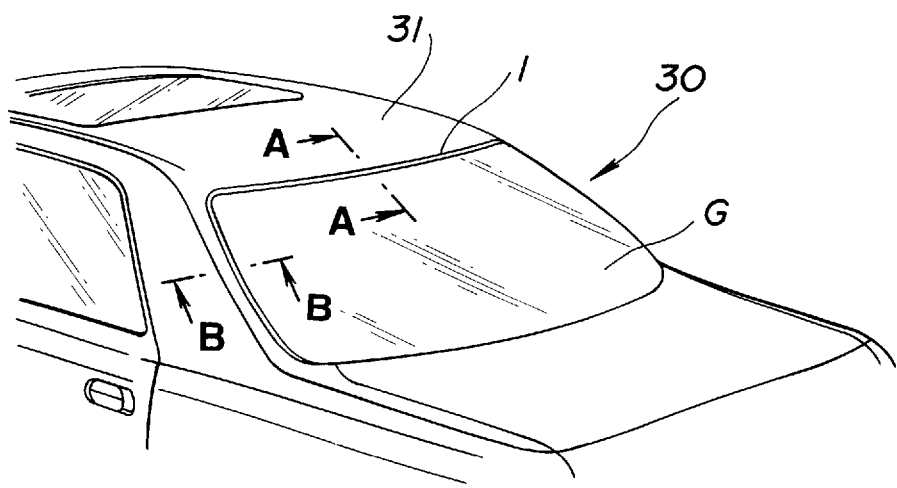
FIG. 3 is a rear view of the motor vehicle, showing the weather strip properly applied to the rear window of the vehicle.
Figure 4:
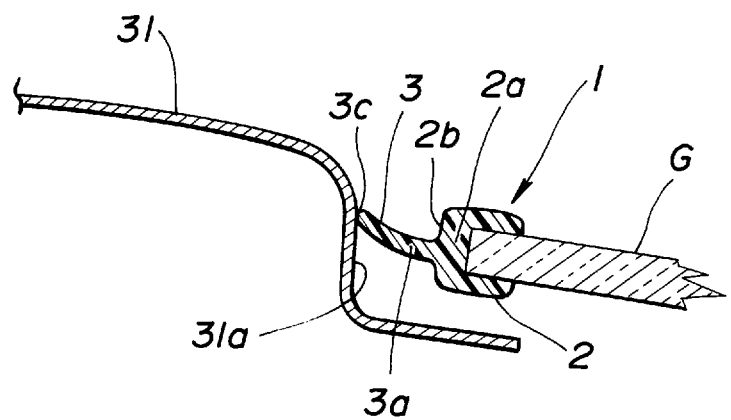
FIG. 4 is an enlarged sectional view taken along the line A—A of FIG. 3.

As is understood from FIGS. 2 and 4, particularly FIG. 4 which shows the sectional view taken along the line A—A of FIG. 3, the upper part 3a of the lip portion 3 arranged at a horizontally extending upper portion of the weather strip 1 projects outward from a middle part of the major portion 2. As is seen from FIG. 4, a leading edge 3c of the upper part 3a of the lip portion 3 is pressed against a wall 31a defined by a recessed rear edge portion of a roof panel 31, which portion bounds a horizontally extending upper periphery of the rear window opening.

Figure 5:
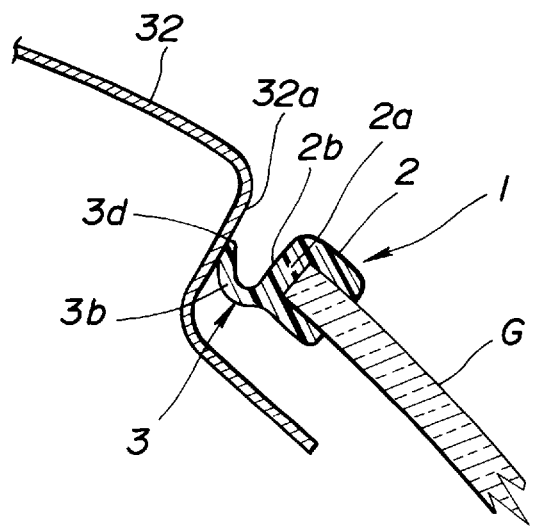
FIG. 5 is an enlarged sectional view taken along the line B—B of FIG. 3.

As is understood from FIGS. 2, 3 and 5, particularly FIG. 5 which shows the sectional view taken along the line B—B of FIG. 3, the side part 3b of the lip portion 3 arranged at each side portion of the weather strip 1 projects outward from a lower part of the major portion 2. As is seen from FIG. 5, a leading edge 3d of the side part 3b of the lip portion 3 is pressed against a wall 32a defined by a recessed rear edge portion of a rear pillar panel 32, which portion bounds a side periphery of the rear window opening.

As is understood from FIG. 2, each side part 3b of the lip portion 3 is gradually raised as the distance from the upper part 3a increases, which thus constitutes a water drip channel at a generally upper half of the side part 3b between the side part of the window pane G and that of the rear window opening.

In FIG. 1, there is shown the extruding device of the present invention, by which the above-mentioned weather strip 1 is produced.

The extruding device comprises first and second material extruders 24 and 25 from which a fluidized material for soft or hard polyvinyl chloride (PVC) is fed to a fixed shaping die 21. The fixed shaping die 21 is formed with a main extruding opening 23 of a generally C-shaped cross section, which is communicated with the two material extruders 24 and 25 through respective passages.

In front of the fixed shaping die 21, there is horizontally movably arranged a movable shaping die 22 which is driven by a drive device 27 through a shaft 27a. The movable shaping die 22 is formed with an auxiliary extruding opening 26 which is communicated with a third material extruder 28 through a flexible feeding tube 29. The third material extruder 28 feeds the movable shaping die 22 with a fluidized material for soft polyvinyl chloride (PVC) containing paraffin or butadiene.

It is to be noted that the movable shaping die 22 is arranged at a certain distance "L" from the fixed shaping die 21. The distance "L" is so determined as to permit the major portion 2 extruded from the main extruding opening 23 to become stable in dimension and shape while keeping the highly heated fluidized condition. In other words, the distance "L" is so determined as to permit the major portion 2 extruded from the opening 23 to complete its shrinkage until the time when the same reaches to the movable shaping die 22. Thus, the distance "L" should be changed depending on the materials for the major portion 2. Experiments have revealed that when the distance "L" is about 30 mm to about 200 mm, satisfied result is expected.

A wire 17 is driven by drive rollers (not shown) to pass through the main extruding opening 23 of the fixed shaping die 21, which serves as a reinforcing core member of the extruded weather strip 1.

Designated by numeral 40 is a supporter having a rounded upper portion on which the extruded weather strip 1 is slidably supported. As shown, the supporter 40 is positioned just below the movable shaping die 22.

In the following, operation of the extruding device of the invention for extruding the weather strip 1 will be described with reference to FIG. 1.

The first and second material extruders 24 and 25 feed the fixed shaping die 21 with a fluidized plastic material (PVC) to allow the main extruding opening 23 to continuously extrude the major portion 2 of the weather strip 1. The extruded major portion 2 travels toward the movable shaping die 22 and, after a while, comes to a position just below the movable shaping die 22.

It is now to be noted that, due to the certain distance "L" between the fixed and movable shaping dies 21 and 22, the extruded major portion 2 from the main extruding opening 23 has become stable in dimension and shape until the time when the same reaches to the movable shaping die 22. That is, during the time for which the major portion 2 travels from the main extruding opening 23 to the movable shaping die 22, the major portion 2 has completed its shrinkage while keeping the highly heated fluidized condition.

When the major portion 2 comes to the position just below the movable shaping die 22, the third material extruder 28 feeds the movable shaping die 22 with a fluidized plastic material (for soft PVC) to allow the auxiliary extruding opening 26 to continuously extrude the lip portion 3 onto the upper surface 2b of the upper wall 2a of the major portion 2. With this, an insufficiently cured weather strip 1 is produced, which includes the major portion 2 and the lip portion 3.

When the extruded weather strip 1 is brought up to show a given length, the movable shaping die 22 is slowly moved in one direction, that is, leftward in case of the illustrated embodiment. With this, the lip portion 3 gradually changes its position relative to the major portion 2 for formation of the water drip channel.

If desired, a pivot mechanism (not shown) may be employed for pivoting the movable shaping die 22 about an imaginary axis which axially passes through a lowermost part of the auxiliary extruding opening 26 and extends in parallel with the direction along which the extruded weather strip 1 travels.

Figure 6:
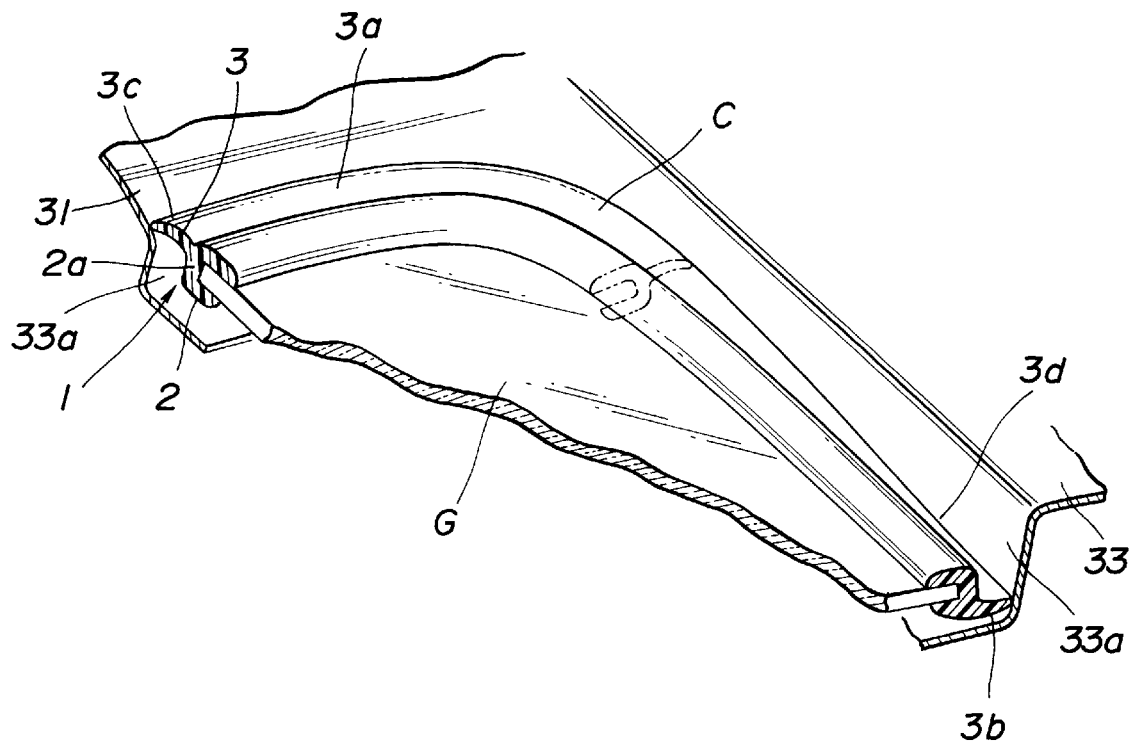
FIG. 6 is a front but partial view of a motor vehicle, showing a weather strip to be applied to a windshield of the vehicle, the weather strip being produced by the extruding device of the invention.
Figure 7:
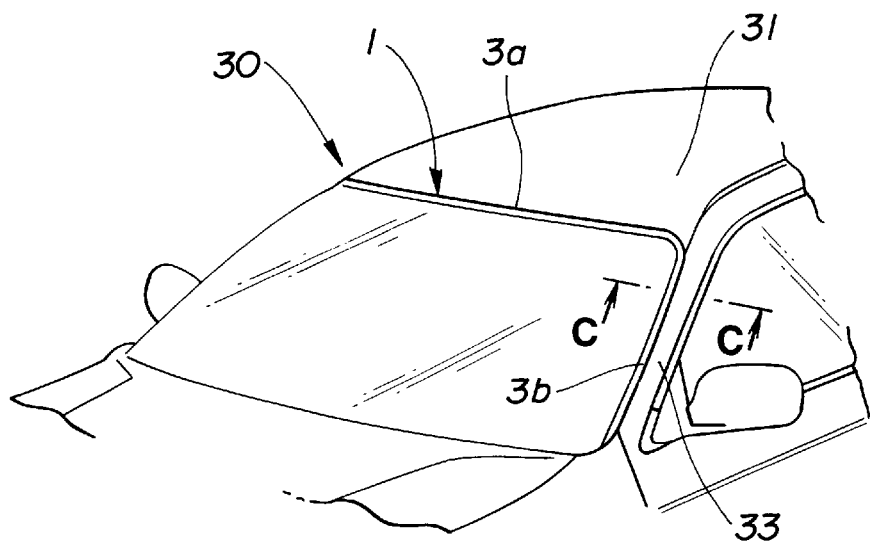
FIG. 7 is a front view of the motor vehicle, showing the weather strip properly applied to the windshield of the vehicle.
Figure 8:
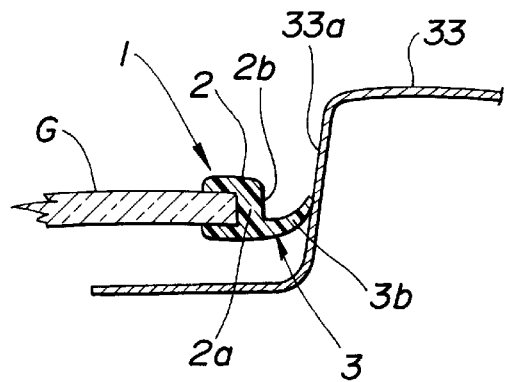
FIG. 8 is an enlarged sectional view taken along the line C—C of FIG. 7.

FIGS. 6 to 8 show a weather strip 1 which is applied to a windshield (or front window) of a motor vehicle. That is, the weather strip 1 of these drawings is shaped to be arranged between a periphery of a windshield opening of a vehicle body 30 and that of a windshield G.

As is best seen from FIG. 6, the upper part 3a of the lip portion 3 extends outward from an upper portion of the upper wall 2a of the major portion 2, and the leading edge 3c of the upper part 3a is pressed against an upper part of a wall 33a defined by a recessed front edge portion of a roof panel 31. With this, a flush-surface arrangement is achieved between the upper part of the weather strip 1 and the roof panel 31.

As is understood from FIGS. 6, 7 and 8, each side part 3b of the lip portion 3 is gradually lowered as the distance from the upper part 3a increases, which constitutes a water drip channel between the side part of the windshield G and that of the windshield opening of the vehicle body 30.

In the following, advantages of the present invention will be described.

First, due to the certain distance "L" defined between the fixed and movable shaping dies 21 and 22, the major portion 2 of the weather strip 1 extruded from the main extruding opening 23 can become stable in dimension and shape until the time when the lip portion 3 is extruded onto the major portion 2. Thus, the weather strip 1 produced by the invention can exhibit a high precision in dimension and shape.

Second, because the fixed and movable shaping dies 21 and 22 are spaced, maintenance work for them is easily made. In fact, cleaning of the main and auxiliary extruding openings 23 and 26 is readily carried out by using only a simple tool.

Figure 9:
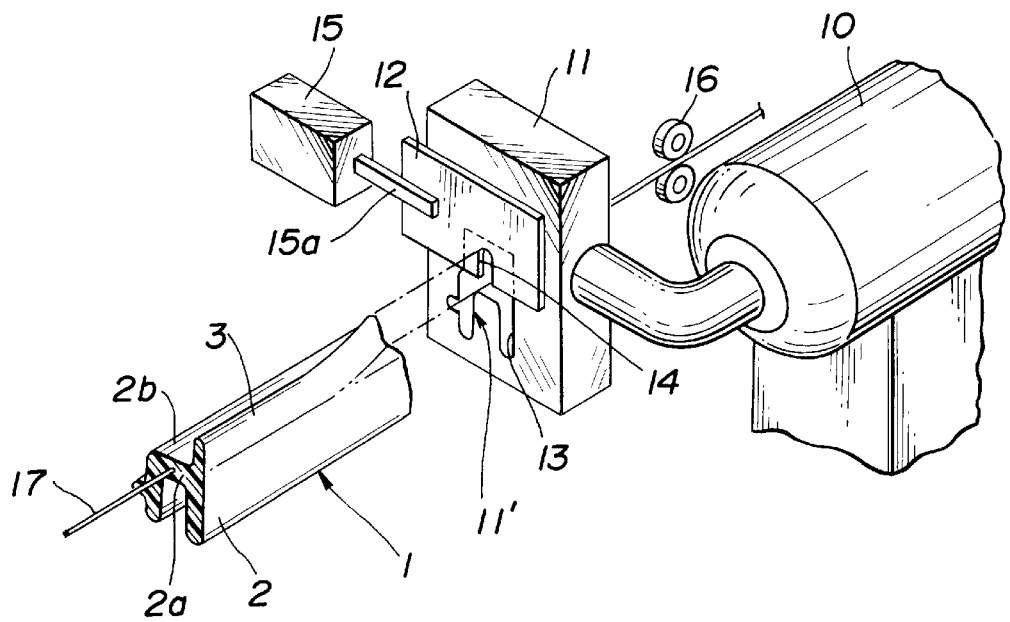
FIG. 9 is a view similar to FIG. 1, but showing a conventional extruding device.

Third, because the material for the lid portion 3 is fed by a separate material extruder 28, the lid portion 3 can be constructed of a material different from that of the major portion 2. This advantage is not possessed by the conventional extruding device of FIG. 9.

Fourth, if, as is described hereinabove, a pivoting mechanism is employed for pivoting the movable shaping die 22, the inclination angle of the lip portion 3 relative to the major portion 2 is easily changed. In this case, the produced weather strip 1 can have a shape optimum to the portion to which the same is applied.

What is claimed is:

1. A device for extruding a weather strip including an elongate major portion and an elongate lip portion which is integrally formed on said major portion, said device comprising:

a material extruder which feeds a first material for the major portion;

an additional material extruder which feeds a second material for the lip portion;

a fixed shaping die formed with a main extruding opening from which the first material from said material extruder is extruded for formation of said major portion; and a movable shaping die formed with an auxiliary extruding opening from which the second material from said additional material extruder is extruded for formation of said lip portion, said movable shaping die being movable relative to said fixed shaping die, wherein said movable shaping die is located in front of said fixed shaping die and spaced from the same by a given distance.

2. A device as claimed in claim 1, in which said given distance is so determined as to permit the major portion extruded from said main extruding opening to become stable in shape while keeping a highly heated fluidized condition.

3. A device as claimed in claim 2, in which said main extruding opening has a generally U-shape when viewed in front of said fixed shaping die and said auxiliary extruding opening has a generally lip shape when viewed in front of said movable shaping die.

4. A device as claimed in claim 2, in which said material extruder comprises two material extruders which are connected to said main extruding opening of the fixed shaping die through respective passages.

5. A device as claimed in claim 2, in which said additional material extruder is connected to said auxiliary extruding opening of the movable shaping die through a flexible tube.

6. A device as claimed in claim 2, in which said movable shaping die is driven by a drive mechanism in a manner to move in a direction perpendicular to the direction along which the extruded major portion from said main extruding opening travels.

7. A device as claimed in claim 2, further comprising a supporter which is positioned just below said movable shaping die to slidably support thereon the extruded major portion from said main extruding opening.

8. A device as claimed in claim 7, in which said supporter has a rounded upper portion on which the extruded major portion slides.

9. A device as claimed in claim 2, in which said given distance is approximately 30 mm to approximately 200 mm.

\* \* \* \* \*